(12) United States Patent
Luebbe et al.

(10) Patent No.: US 11,701,708 B2
(45) Date of Patent: Jul. 18, 2023

(54) METHOD FOR FABRICATION OF A COMPOSITE PART

(71) Applicant: The Swatch Group Research and Development Ltd, Marin (CH)

(72) Inventors: Henning Luebbe, Bienne (CH); Stewes Bourban, Chabrey (CH)

(73) Assignee: The Swatch Group Research and Development Ltd, Marin (CH)

( * ) Notice: Subject to any disclaimer, the term of this patent is extended or adjusted under 35 U.S.C. 154(b) by 1229 days.

(21) Appl. No.: 16/093,424

(22) PCT Filed: Apr. 28, 2017

(86) PCT No.: PCT/EP2017/060192
§ 371 (c)(1),
(2) Date: Oct. 12, 2018

(87) PCT Pub. No.: WO2017/191050
PCT Pub. Date: Nov. 9, 2017

(65) Prior Publication Data
US 2019/0143416 A1    May 16, 2019

(30) Foreign Application Priority Data

May 3, 2016    (EP) .................................. 16168124

(51) Int. Cl.
*B22F 7/06*    (2006.01)
*A44C 5/00*    (2006.01)
(Continued)

(52) U.S. Cl.
CPC .............. *B22F 7/06* (2013.01); *A44C 5/0053* (2013.01); *B22F 3/225* (2013.01); *B22F 3/24* (2013.01);
(Continued)

(58) Field of Classification Search
CPC .... B22F 7/06; B22F 3/225; B22F 3/24; B22F 2003/247; B22F 2301/35; B22F 2302/25;
(Continued)

(56) References Cited

U.S. PATENT DOCUMENTS

| 3,690,062 A | 9/1972 | Kasai et al. |
| 2003/0062660 A1* | 4/2003 | Beard ................... H02K 15/02 |
| | | 264/645 |
| 2011/0259753 A1 | 10/2011 | Grossenbacher et al. |

FOREIGN PATENT DOCUMENTS

| CN | 104972125 A | 10/2015 |
| EP | 2 380 864 A1 | 10/2011 |
| JP | 2008-029803 | 2/2008 |

OTHER PUBLICATIONS

International Search Report dated Jul. 7, 2017, in PCT/EP2017/060192 filed Apr. 28, 2017.
(Continued)

*Primary Examiner* — Brian D Walck
*Assistant Examiner* — Danielle Carda
(74) *Attorney, Agent, or Firm* — Oblon, McClelland, Maier & Neustadt, L.L.P.

(57) ABSTRACT

A method for fabrication of a composite component including a first material containing steel 316L and a second material containing zirconia powder formed in a single sintering. The method for fabrication includes:
  a) forming a first injection molding composition including steel 316L powder and a second injection molding composition including zirconia powder;
  b) agglomerating via injection molding one of the first and second compositions to form at least a first part of a blank;
  c) agglomerating by injection molding the other of the first and second materials against the first part of the blank to form at least a second part of the blank; and
(Continued)

d) non-consecutively sintering the first and second compositions forming the blank to obtain the composite component formed of steel 316L and zirconia.

5 Claims, 1 Drawing Sheet

(51) Int. Cl.
| | |
|---|---|
| B22F 3/22 | (2006.01) |
| B22F 3/24 | (2006.01) |
| B28B 1/24 | (2006.01) |
| B28B 11/08 | (2006.01) |
| C22C 33/02 | (2006.01) |
| G04B 3/04 | (2006.01) |
| G04B 19/04 | (2006.01) |
| G04B 19/12 | (2006.01) |
| G04B 19/18 | (2006.01) |
| G04B 37/22 | (2006.01) |
| G04B 39/00 | (2006.01) |

(52) U.S. Cl.
CPC ............ *B28B 1/24* (2013.01); *B28B 11/0845* (2013.01); *B22F 2003/247* (2013.01); *B22F 2301/35* (2013.01); *B22F 2302/25* (2013.01); *B22F 2998/10* (2013.01); *C22C 33/0285* (2013.01); *G04B 3/04* (2013.01); *G04B 19/042* (2013.01); *G04B 19/12* (2013.01); *G04B 19/18* (2013.01); *G04B 37/22* (2013.01); *G04B 39/004* (2013.01)

(58) Field of Classification Search
CPC ... B22F 2998/10; B28B 1/24; B28B 11/0845; G04B 19/12; G04B 37/22; G04B 3/04; G04B 19/042; G04B 19/18; G04B 39/004; A44C 5/0053; C22C 33/0285; Y02P 10/25
USPC ......................................................... 75/235
See application file for complete search history.

(56) References Cited

OTHER PUBLICATIONS

Rajabi, J. et al., "Powder compaction of biomaterials: stainless steel 316L and nanocrystalline yttria stabilized zirconia", Materials Technology: Advanced Performance Materials, vol. 30, No. 5, 2015, pp. 313-320, 9 pages, XP055316783.

Dourandish, M. et al., "Pressureless Sintering of 3Y-TZP/Stainless-Steel Composite Layers", Journal of American Ceramic Society, vol. 91, No. 11, 2008, pp. 3493-3503, XP055316784.

Combined Chinese Office Action and Search Report dated Mar. 18, 2021 in Chinese Patent Application No. 201780027179.1 (with English translation), 12 pages.

Chinese Office Action dated Oct. 26, 2020, in Chinese Patent Application No. 201780027179.1 (with English translation), 11 pages.

* cited by examiner

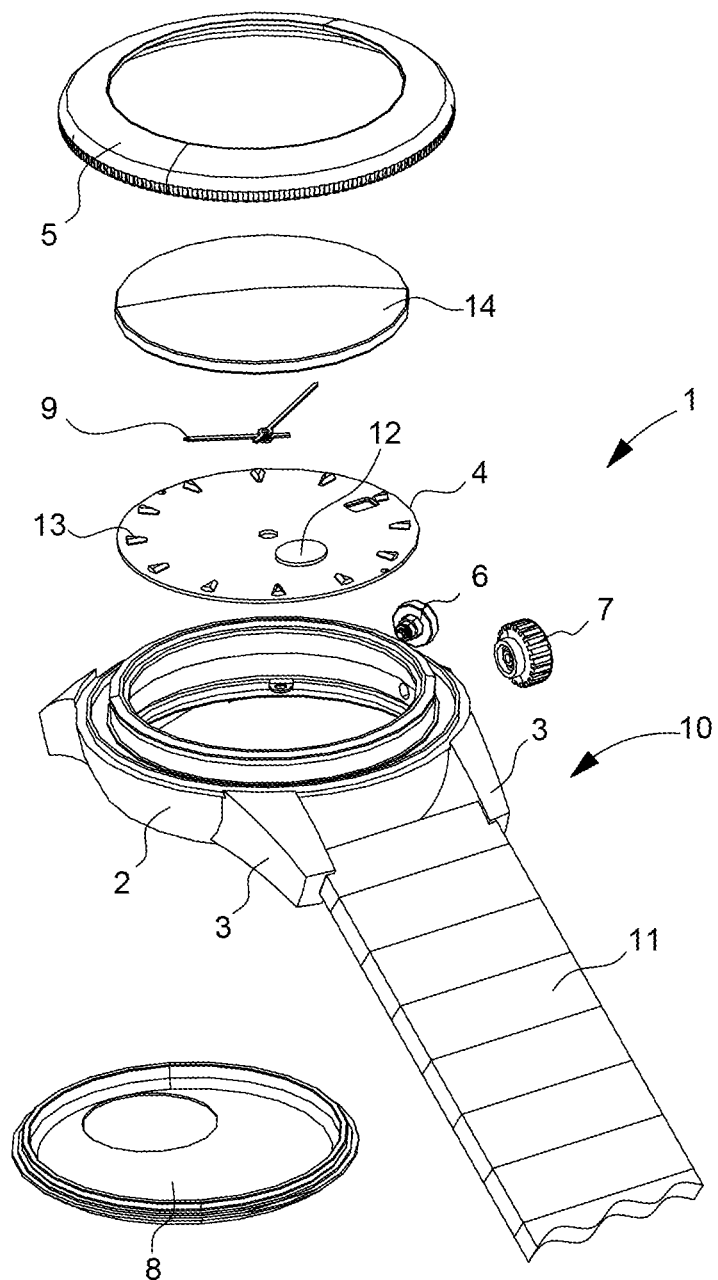

METHOD FOR FABRICATION OF A COMPOSITE PART

FIELD OF THE INVENTION

The invention relates to a method for fabrication of a composite component and more specifically, a metal-ceramic composite component, i.e. a component combining two distinct materials, respectively made from metal and ceramic.

BACKGROUND OF THE INVENTION

EP Patent No EP2380864 discloses the fabrication of a ceramic element inlaid with galvanic decorations. This method provides numerous advantages but requires many implementation steps to be carried out.

The publication entitled 'Powder compaction of bimaterials: stainless steel 316L and nanocrystalline yttria stabilised zirconia' describes the forming of a steel 316L and nanocrystalline yttria stabilised zirconia composite by powder compaction or uniaxial pressing. According to this document, a polyvinyl alcohol, in a proportion of 4% by weight, is added to the mixture of each powder as binder. In this forming method of simultaneously pressing two materials, identical densities are obtained for both powders in the green part. Despite the similar densities of the two powders, which is a necessary condition to obtain a component having the fewest possible cohesion defects between the two materials after co-sintering, such as cracks, it is noted that according to this publication, components obtained by the compacting process always have such cohesion defects.

The introductory part of this document also mentions all the difficulties that arise when fabricating ceramic and metal injected moulded components, due to the very different coefficients of thermal expansion of metals and ceramics. This document is, moreover, totally silent as to the type of ceramic and metals that were combined and clearly recommends, for a combination of steel 316L and zirconia, powder compaction or uniaxial pressing followed by co-sintering. It will also be noted that the coefficient of thermal expansion (CTE) of steel 316L is much higher than that of zirconia (15-18 vs 9-11 ppm, 1/K) which reinforces the prejudice of those skilled in the art on reading this publication against co-injecting an injection moulding mixture containing steel powder and an injection moulding mixture containing zirconia powder to make a steel 316L/zirconia component.

SUMMARY OF THE INVENTION

It is an object of the present invention to overcome all or part of the aforecited drawbacks by proposing an alternative method for fabrication of a metal-ceramic composite component which requires fewer implementation steps.

To this end, the invention relates to a method for fabrication of a composite component including the following steps:
a) forming a first material containing steel 316L powder and at least a first additive and a second material containing zirconia powder and at least a second additive;
b) agglomerating one of the first and second materials to form at least a first part of a blank;
c) agglomerating the other of the first and second materials against the first part of the blank to form at least a second part of the blank;
d) sintering the blank to obtain the composite component formed of steel 316L and zirconia.

It is clear therefore that the composite component can be made mostly of metal or alternatively be made mostly of ceramic. Further, it is noted that the steps are simpler to implement, and the blank formed of the two types of material is sintered in a single step and not consecutively for each material, which avoids repeated handling of intermediate components as in the case of the prior art. Further, against all expectations, and despite the significant difference in coefficient of thermal expansion between steel 316L and zirconia, via the bi-injection moulding method described above, it was possible to obtain a complex 3D bi-injected component with satisfactory cohesion between its steel and zirconia parts.

In accordance with other advantageous variants of the invention:
said at least one first additive includes a binder and/or a surfactant and/or a plasticizer;
said at least one additive includes an organic compound and/or a polymer;
said at least one second additive includes a binder and/or a surfactant and/or a plasticizer;
said at least one second additive includes an organic compound and/or a polymer;
in step a), the grains of steel 316L powder and the grains of zirconia powder are arranged to allow substantially identical shrinkage in step d);
in step b), the first material is agglomerated and in step c) the second material is agglomerated;
in step b), the second material is agglomerated and in step c) the first material is agglomerated:
step b) is achieved by injection moulding;
step c) is achieved by injection moulding;
the method includes a final finishing step for improving the aesthetics of the composite component formed in step d).

Moreover, the invention relates to a composite component obtained by the above mentioned method, characterized in that the composite component combines, in one piece, two distinct materials, respectively made from steel 316L and zirconia.

It is clear therefore that the composite component contains two materials which are inseparable, which can be mostly metal or alternatively mostly ceramic. As the two materials are sintered at the same time, they form a one-piece component despite each being of a different nature.

In accordance with other advantageous variants of the invention:
the composite component forms all or part of a case, a case middle, a horn, a dial, a flange, a bezel, a push piece, a crown, a case back cover, a hand, a bracelet or strap, a link, a clasp, a decoration, an applique or a crystal.

BRIEF DESCRIPTION OF THE DRAWINGS

Other features and advantages will appear clearly from the following description, given by way of non-limiting illustration, with reference to the single FIGURE, which is a representation of external timepiece parts which can be produced according to the invention.

DETAILED DESCRIPTION OF PREFERRED EMBODIMENTS

As explained above, the invention relates to a metal-ceramic composite component. This composite component was devised for applications in the field of horology, such as for example, the external parts of a timepiece. Naturally, the composite component according to the invention is not limited to the external parts of a timepiece and more generally to horology. Thus, in a non-limiting manner, it is also possible to envisage that this composite component could be applied in the field of tableware, cutlery or jewellery.

By way of non-limiting example and with reference to FIG. 1, the composite component can form, in particular, all or part of a case 1, such as the case middle 2 and horns 3, a dial 4, a flange, a bezel 5, a push-piece 6, a crown 7, a case back cover 8, a hand 9, a bracelet or strap 10 such as a link 11, a decoration 12, an applique 13, a crystal 14 or a clasp.

The invention also relates to a method for fabrication of a composite component. The method includes a first step a) intended to form a first material containing powder, for example steel 316L powder, and at least a first additive, and a second material containing powder, for example, zirconia powder, and at least a second additive.

Preferably, the first and second materials, formed respectively by injection moulding compositions called 'feedstock' in the injection moulding industry, each form powders whose grains shrink in a substantially identical manner during sintering.

Further, said at least a first additive and said at least a second additive can include a binder and/or a surfactant and/or a plasticizer depending on the component to be fabricated and/or the agglomeration system used. Said at least a first additive and said at least a second additive can also include an organic compound and/or a polymer, possibly supplemented by an additive such as, for example, a gelling compound and/or a surface active compound.

The method continues with a second step b) intended to agglomerate one of the first and second materials inside a mould to form at least a first part of a blank. Advantageously according to the invention, it is clear therefore, that in step b) of the method, either the first material or the second material can be agglomerated. This means that the composite compound could be metal-based or ceramic-based. By way of example, step b) can be achieved by injection moulding, pressing, 3D printing or slip casting. However, preferably, injection moulding is used to obtain more varied geometries.

The method continues with the third step c) intended to agglomerate the other of the first and second materials against the first part of the blank to form at least a second part of the blank. By way of example, step c) can be achieved by injection moulding, pressing, overmoulding, dip coating, 3D printing or slip casting. However, preferably, injection moulding is used to obtain more varied geometries.

Preferably, it is clear therefore that steps b) and c) can consist of ceramic and metal injection moulding also known by the abbreviations CIM (Ceramic Injection Moulding) MIM (Metal Injection Moulding) and PIM (Powder Injection Moulding).

Finally, the method continues with step d) for sintering the blank in order to obtain the composite component formed of steel 316L and zirconia. By way of example, it is thus possible to agglomerate, in step b), a zirconia forming a main bezel body with recesses and, in step c), steel 316L, which agglomerates to fill said recesses and thus form one or more graduations. After sintering, it is therefore possible to obtain a main composite component which is black, for example provided by the zirconia, and including grey graduations, for example provided by steel 316L. As explained above, the reverse is also possible.

Advantageously according to the invention, the blank formed of two types of material is sintered in a single step d) and not consecutively for each material, which avoids repeated handling of intermediate components as in the case of the prior art.

Further, steel 316L is selectively chosen since it has good mechanical resistance to scratching and to corrosion, is insensitive to magnetic fields and is hypoallergenic to wear. It is clear therefore that steel 316L has similar qualities to those of zirconia and therefore forms, in combination therewith, a composite compound perfectly suited to the external parts of a timepiece.

Thus, as other examples, the composite component obtained by the method can form a case 1, whose middle part 2 is made of steel 316L and whose horns 3 are made of zirconia (or vice versa), a steel 316L bezel with zirconia graduations, or the links 11 of a bracelet 10 made of steel 316L with zirconia decorations (or vice versa).

Of course, the present invention is not limited to the illustrated example but is capable of various variants and modifications that will appear to those skilled in the art. In particular, step d) can also include a debinding phase for removing said at least a first and a second additive and, more generally, any additive used before the sintering phase intended to increase the density of the blank.

A final finishing step for improving the aesthetics of the composite component formed in step d) could also be envisaged. Such a finishing step can typically include machining and/or brushing and/or polishing to make the composite component more aesthetically attractive.

The invention claimed is:

1. A method for fabrication of a composite component for a timepiece, the method comprising:
   a) forming a first injection molding composition including steel 316L powder and a second injection molding composition including zirconia powder;
   b) agglomerating via injection molding one of the first and second injection molding compositions to form at least a first part of a blank;
   c) agglomerating by injection molding the other of the first and second injection molding compositions against the first part of the blank to form at least a second part of the blank; and
   d) non-consecutively sintering the first and second injection molding compositions forming the blank to obtain the composite component formed of steel 316L and zirconia,
   wherein the first part forms a main bezel body of the timepiece having recesses, and the second part is filled in the recesses to form one or more graduations.

2. The method according to claim 1, wherein, in a), grains of steel 316L powder and grains of zirconia powder are arranged to allow substantially identical shrinkage in d).

3. The method according to claim 1, further comprising a final finishing improving aesthetics of the composite component formed in d).

4. The method according to claim 3, wherein the final finishing includes machining and/or brushing and/or polishing.

5. The method according to claim 1, wherein the second injection molding composition is agglomerated in b), and subsequently the first injection molding composition is agglomerated in c).

* * * * *